Dec. 17, 1968  W. J. ROBICHEAUX  3,416,681
CAN SORTING APPARATUS

Filed Jan. 31, 1967  3 Sheets-Sheet 1

INVENTOR.
WARREN J. ROBICHEAUX

Dec. 17, 1968  W. J. ROBICHEAUX  3,416,681
CAN SORTING APPARATUS
Filed Jan. 31, 1967  3 Sheets-Sheet 3
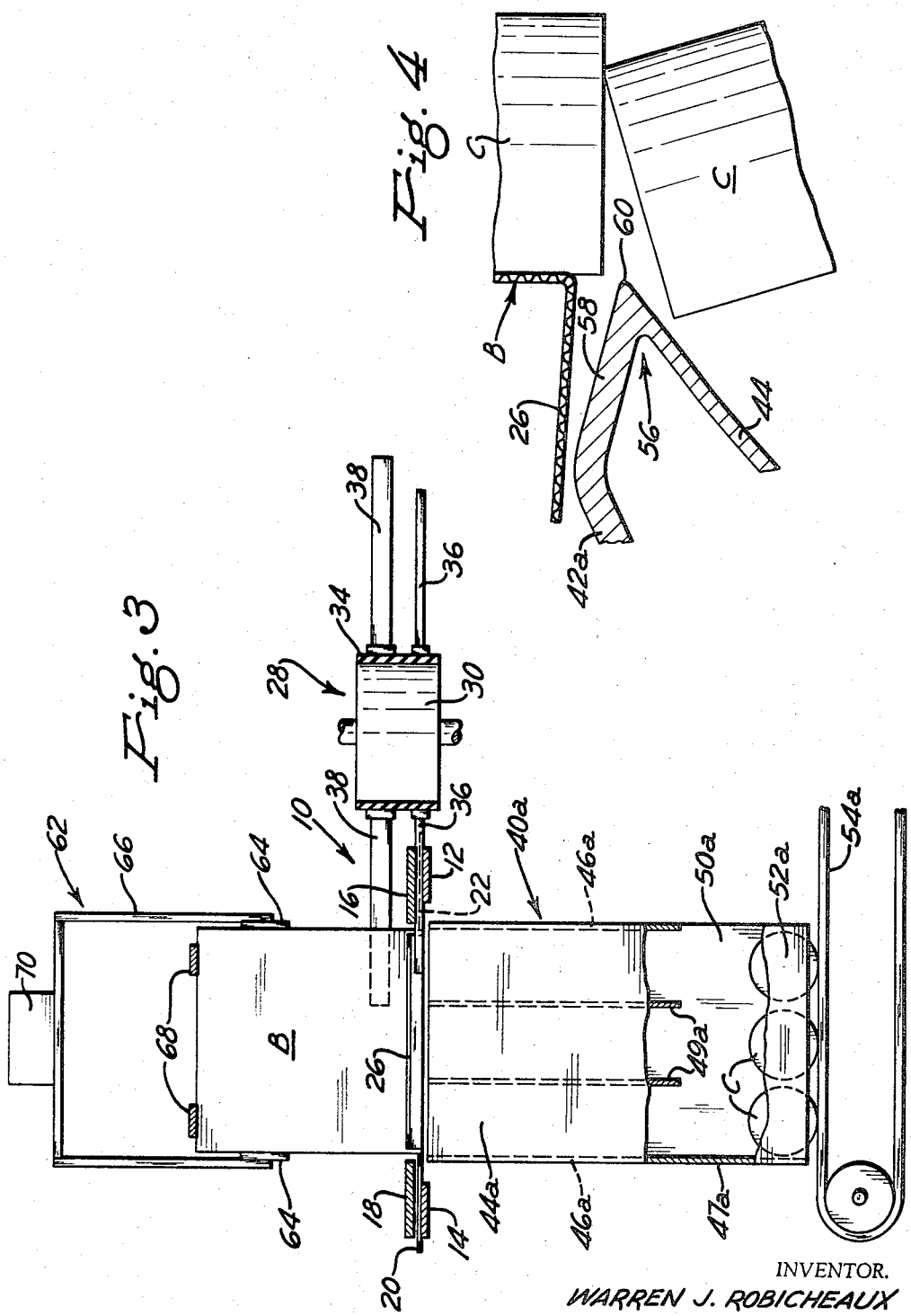
INVENTOR.
WARREN J. ROBICHEAUX United States Patent Office 3,416,681
Patented Dec. 17, 1968

3,416,681
CAN SORTING APPARATUS
Warren J. Robicheaux, Port Arthur, Tex., assignor to Gulf Oil Corporation, Pittsburgh, Pa., a corporation of Pennsylvania
Filed Jan. 31, 1967, Ser. No. 613,029
12 Claims. (Cl. 214—308)

ABSTRACT OF THE DISCLOSURE

Apparatus for unloading a plurality of similar articles from containers open on one end in which the articles are packed in orderly rows, wherein the container is held by its side flaps in guide rails and moved, upsidedown, across a number of article pick-up stations equal to the number of layers of articles in the height of the container. Each pick-up station comprises a sloped bottom wall down which the articles slide as the container moves across the station, and a divider which insures that the bottommost layer only is directed into that pick-up station, and that all subsequent layers are directed to subsequent pick-up stations.

---

This invention relates to an apparatus for removing cans or similar articles from cartons or containers in which the articles are packed in an orderly manner so as to preserve the orderly arrangement of the articles.

In many factories wherein goods such as liquids are packed into individual cans, the cans are purchased from a supplier who ships the cans to the packing factory packed in orderly rows in shipping cartons or containers. The cans are shipped open at one end, since the packing factory will seal a lid onto the can after the goods are packed therein. The can supplier generally ships the cans packed in an orderly manner in the shipping cartons, and the same shipping cartons are used to ship the filled cans by the packer.

Several methods are known for removing empty cans from containers and arranging them in orderly rows for filling.

The empty cans may be placed by hand on a filling line conveyor in orderly rows with open ends facing one way from nearby stacks of cartons transported there by separate conveyor or other means.

The empty cans may be dumped by separate conveyor into an unscrambling machine which arranges them in orderly rows with their open ends facing in one way and thence to a filing line.

Cartons of empty cans may be conveyed to an unscrambling machine and the empty cans dumped therein by a carton inverting device. The unscrambler sorts the empty cans in orderly rows with open ends facing in one direction and feeds them onto the filling line. The empty cartons are uprighted as they leave the unscrambler and are conveyed to a packing machine where filled cans are placed in them.

The present invention eliminates substantially all hand operation in these methods, and eliminates the unscrambling machine entirely, thus saving time and money, and permitting more efficient use of factory floor space.

The present invention provides an improved means to automatically remove the cans from the shipping cartons so as to preserve the orderly manner in which they are packed therein and to deliver them directly to the filling machines, thereby eliminating the operation of dumping the cans from the shipping cartons, and eliminating the unscrambling equipment.

Figure 1:
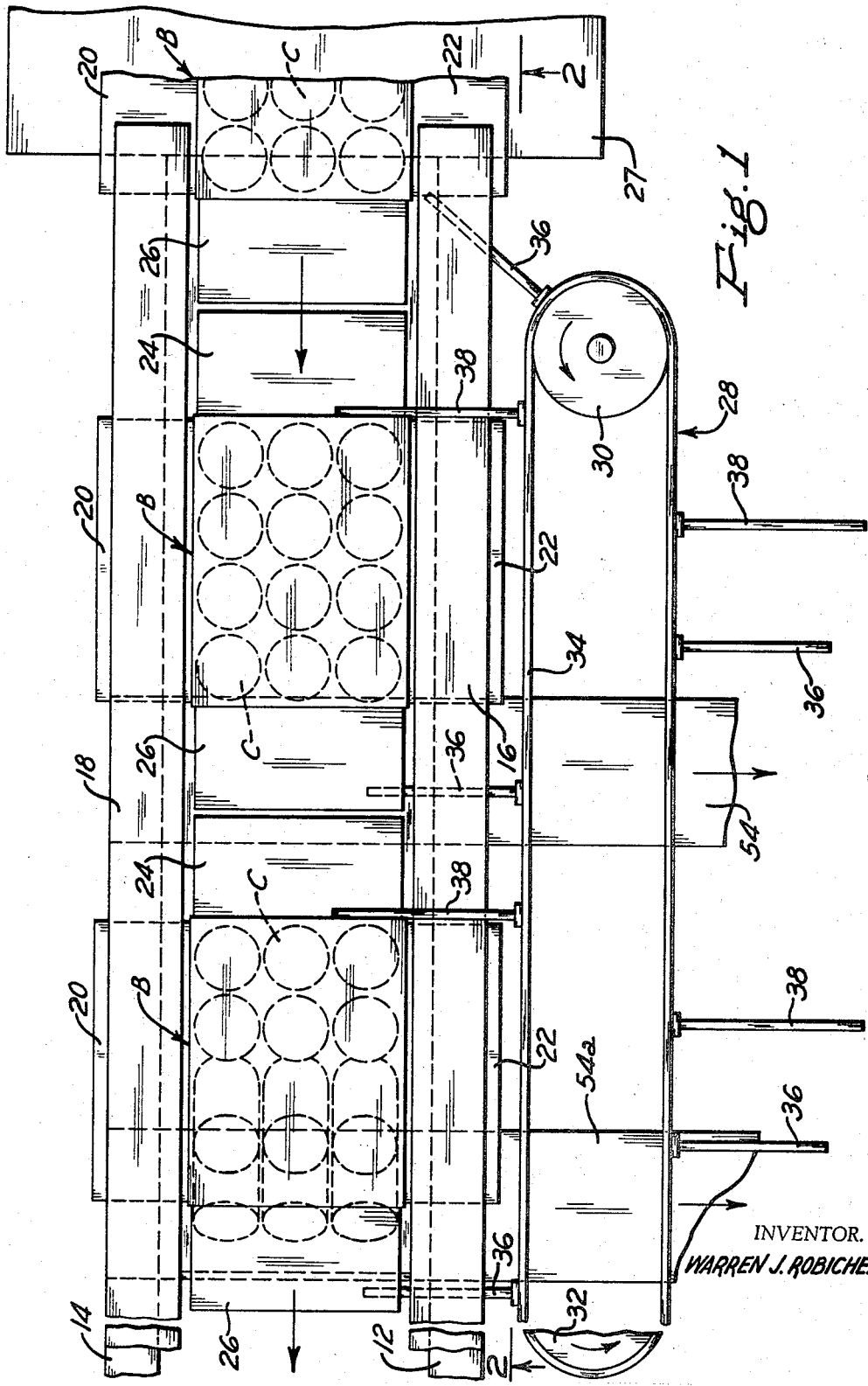
Figure 2:
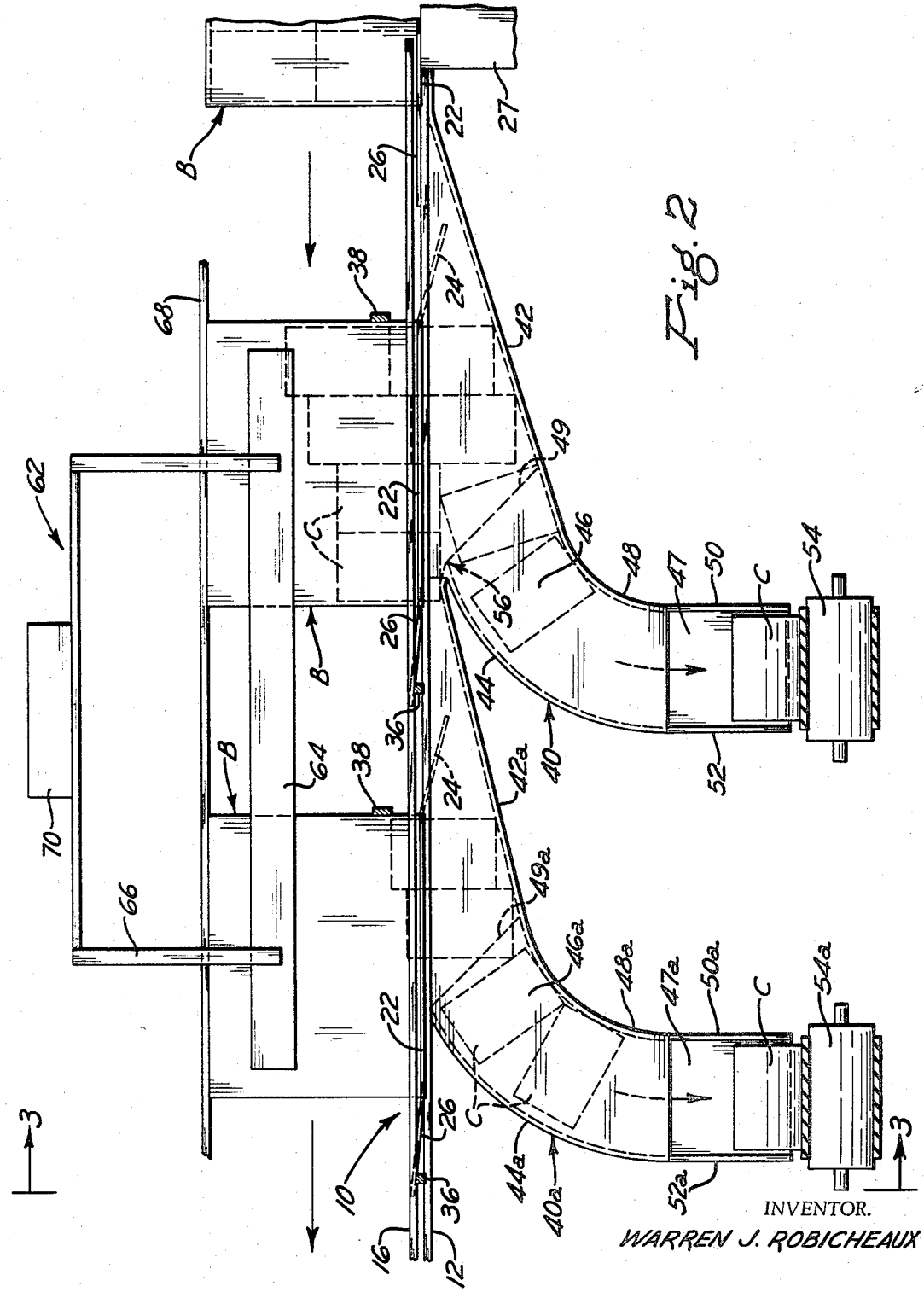

In the accompanying drawing forming a part of this disclosure: FIG. 1 is a top plan view of a machine embodying the invention with some parts omitted and some parts in cross-section for the purpose of clarity; FIG. 2 is a cross-sectional view taken on line 2—2 of FIG. 1; FIG. 3 is a cross-sectional view taken on line 3—3 of FIG. 1; and FIG. 4 is an enlarged view of a detail partly in cross-section and partly broken away.

Referring now in detail to the drawing, 10 designates a machine embodying the invention. Machine 10 comprises a pair of bottom guide rails 12 and 14, and a pair of top guide rails 16 and 18 overlying and in spaced relation to bottom guide rails 12 and 14, respectively. The can C may be packed in the shipping containers or boxes B in any number of rows along the height, width and length of the carton, depending upon the sizes of the cans and containers and the preference of the packing factory. For purposes of illustration, the invention is shown set up for use with one quart liquid cans packed two dozen to the box and measuring three cans across the width, four cans along the length, and two layers in the height. It will of course be understood that the distance between the guide rails, the widths of the various chutes to be described below, the speed of the carton driving means described below, and other dimensions of the machine, will be dictated by the particular size of the cartons and cans to be used.

The boxes B shown are ordinary corrugated cardboard boxes, and comprise side flaps 20 and 22, a rear flap 24, and a front flap 26. The cartons with the cans therein are usually sent by the can manufacturer to the packing factory with the flaps 20 through 26 unsealed so that the box is open on one side. Referring to FIG. 2, the opened carton is turned upside down onto a suitable feeding table 27 or the like with the four flaps 20 through 26 open. The side flaps 20 and 22 are inserted between the guide rails 12 and 16 and 14 and 18 respectively, and the carton is fed into the machine, (to the left in FIGS. 1 and 2) until it is picked up by the feeding means 28.

Feeding means 28 comprise means to move the boxes B over the can pick-up chutes, described below, at a predetermined rate of speed and in predetermined spaced relation to each other. Feeding means 28 comprise a front roller 30 and a rear roller 32, either of which may be power driven by any suitable means which includes means to selectively control the speed of the belt. Trained across rollers 30 and 32 is an endless feed belt 34. Mounted on feed belt 34 by any suitable means are a plurality of front flap guiding arms 36, and a plurality of box pusher arms 38. The boxes B move through the machine with their side flaps 20 and 22 held between the respective pairs of guide rails 12 and 16 and 14 and 18. Each arm 36 is positioned on belt 34 with respect to the pusher arm 38 immediately following it so that said arm 36 will support the front flap 26 of that box which is being pushed through the machine by the associated pusher arm 38. Means, such as rows of openings in belt 34, may be provided to permit adjustment of arms 36 and 38 to accommodate the machine to containers having different lengths.

Referring to FIGS. 1 and 3, it can be seen that the guide arms 36 extend between the guide rails 12 and 16 to support the front flap 26 at a height above the bottom guide rail 12 so that the front flap will not get in the way of the cans being removed from the containers as described below. The rear flap 24 is permitted to follow along with no support since it does not interfere with the operation. The portion of the machine opposite the feeding means 28, and between the guide rails 12 and 16 and 14 and 18, comprises means to remove the cans C from the boxes B in such a way as to maintain the orderly arrangement with which they are packed into the boxes, and then feed them directly to can filling machines (not shown), thus avoiding the previous steps of dumping the cans out of the boxes and then reorientating them in an orderly manner in preparation for their transport to the filling machines. Attached to the forward end of feeding table 27 is a forwardly and downwardly inclined bottom wall member 42 comprising part of the first layer can removing means 40. As a full box of cans goes off of feeding table 27 and is picked up by a pusher arm 38 on feeding means 28, the cans in the box will slide down bottom wall 42, and will take on a staggered orientation as shown in dotted lines on the right hand side of FIG. 2. First layer removing means 40 also includes a top wall 44, the upper, rear end of which is substantially in the plane of the upper rear end of bottom wall 42. First layer removing means 40 includes a pair of side walls 46 interconnecting the edges of top and bottom walls 42 and 44 to prevent the cans from falling out of the machine edgewise. Mounted between the top and bottom walls and in parallel relation to the side walls 46 are a pair of partition walls 49. Referring to FIG. 3, it can be seen that the two side walls and the two partition walls define three spaces between them to permit passage of the three cans packed across the width of the container B. It will of course be understood that if more or less cans were packed across the width of the container, an appropriate number more or less of partition walls 49 would be provided.

At its lower end, bottom wall 42 is provided with a curved portion 48 so that this wall ends in a substantially vertically disposed position. The radius of curvature of curved portion 48 is less than the radius of curvature of top wall 44, and these two walls are in spaced relation to each other so that the space between them is slightly larger than the height of a can C, so that the cans are prevented from excessive cocking during their passage between the walls to maintain their orderly arrangement as they pass therethrough. Wall 48 is provided with a vertically disposed extension 50, and wall 44 is provided with a similar vertically disposed extension 52. The rear side wall 46, to the rear of the conveyor belt 54, see FIG. 3, is provided with a downwardly extending extension 47, to prevent the cans C from rolling off the end of the conveyor. Extensions 50 and 52 extend below the lower end of the other side wall 46, and terminate above a first layer can feeding conveyor 54. Thus, the cans C falling by gravity through the space between walls 42, 48 and 50 on the one side and 44 and 52 on the other side, drop directly onto filling machine conveyor belt 54, and are then delivered to the filling machine in the orderly manner in which they were packed in the boxes.

Since, in the example described, there are two layers of cans packed into the box, a second can removing means 40a similar to the first can removing means 40 is provided to feed the second layer of cans C from the boxes to a second filling machine can conveyor belt 54a. Parts of means 40a similar to the corresponding parts of means 40 are indicated by the same reference numerals followed by a.

Means are provided to divide the first layer of cans from the second layer of cans as the box passes over the vertical plane of juncture between the first and second can removing means 40 and 40a. Referring to FIG. 4, there is shown an enlarged view of the dividing means 56 between the two can removing means 40 and 40a. Dividing means 56 comprises the uppermost ends of the walls 44 and 42a which are interconnected by a sloping short wall 58. The rear end of short wall 58 is joined to the upper end of wall 44 to form a relatively sharp corner 60. Corner 60 is positioned below the juncture of the forward end of short wall 58 and the upper end of wall 42a so that short wall 58 is inclined forwardly and upwardly. Curved portion 48 begins at a location spaced below the beginning of top wall 44, so that as a can begins to turn on curved portion 48 its rear corner presses against the can in the layer above. Thus, a wedge or triangular shaped space is created between the upper surface of the lowermost can and the lower surface of the can in the next layer above to permit entry of corner 60 to facilitate division between the layers. The next layer above is pushed up and away from the layer being divided out by being caused to ride up on short wall 58.

Dividing means 56 serves to direct a layer of cans into the can removing means immediately upstream or rearwardly from the dividing means, and also serves to support the next and all subsequent layers of cans and prevents such subsequent layer or layers from going into the can removing means upstream or rearwardly of that dividing means. As is obvious, if a box had three layers of cans, another structure similar to 40 and 40a, and a second dividing means 56 would be provided.

While the invention has been described with respect to a carton carrying two dozen quart cans packed 3 by 4 in 2 layers, it will of course be understood that the invention is equally applicable to any orderly arrangement of cans or can-like objects in cartons, it being necessary to merely adjust some or all of the sizes and speeds of various parts of the invention, such as the width of the removing means, the spacing between the bottom and top walls for various heights of cans, the number of removing means and dividing means for various number of layers in the height of the container, the space between the pairs of guide rails 12 and 16 and 14 and 18, and the like.

Means may also be provided to agitate or vibrate the containers as they pass over the removing means to insure that the cans do not hang up and do fall properly into the removing means. To this end, vibrating means 62 is provided. Vibrating means 62 comprises a pair of longitudinal side members 64 interconnected by a pair of framing members 66 interconnecting the side members 64, and a pair of box top guides 68. The members 64, 66 and 68 may be made of relatively thin resilient strips of metal or other suitable material so as to guide the boxes through the machine and yet grasp them tightly enough so that the vibrations produced by vibrator 70 will be transmitted to the boxes. Vibrating means 62 may be supported in any convenient manner. Depending on the nature of the particular combination of cartons and cans, it may or may not be necessary to use vibrating means 62. That is, if the cans are tightly packed, vibration would be highly desirable to insure that all the cans drop. If the cans are loosely packed, the vibrating means need not be used.

Machine 10 is conveniently arranged within the factory so that the empty boxes delivered off of the front end of the machine are convenient to packing machines or a packer, and are then used to pack the filled cans of goods for shipment.

It is also to be understood that the apparatus is not to be limited to use with empty cans, but can be equally well utilized in other applications where it is necessary to unpack orderly rows of filled cans or any other orderly arrangement of similar articles and to deliver them for subsequent handling while preserving that orderly arrangement.

While the invention has been described in some detail above, it is to be understood that this detailed description is by way of example only, and the protection granted is to be limited only within the spirit of the invention and the scope of the following claims.

I claim:

1. Apparatus for unloading a plurality of similar articles from containers open on one end in which the articles are packed in orderly rows, comprising means to move the containers from rear to front of the apparatus with said open end facing downwardly, means in spaced relation below said open end of the container to support the articles in said container, said support means comprising formardly and downwardly inclined bottom wall means, top wall means extending substantially parallel to said bottom wall means, the reraward end of said top wall means being vertically spaced above a portion of said bottom wall means at a location on said bottom wall means at which the space between said top and bottom wall means is substantially equal to the height of one of said articles, wherein the containers are of the type which comprise front, rear and side flaps adapted to close said open end, and said moving means comprising guide rail means cooperable with said side flaps of said container to support said container and to permit the movement of said container therethrough, said moving means further comprising power driven endless belt means running in a substantially horizontal plane in spaced relation beside said rail means, said belt means comprising container pusher arms extending outwardly of said belt means and over said rail means to engage the rear vertical wall of said containers as said containers are moved along said guide rail means.

2. The apparatus of claim 1, said belt means further comprising container front flap supporting means extending outwardly of said endless belt means and in operative cooperation with said guide rail means to support the front flap of said container above the lowermost plane of said guide rail means.

3. Apparatus for unloading a plurality of similar articles from containers open on one end in which the articles are packed in orderly rows and in at least two layers in height of the container, comprising means to move the containers from rear to front of the apparatus with said open end facing downwardly, means in spaced relation below said open end of the container to support the articles in said container, substantially at the plane of said open end of said container, said support means comprising forwardly and downwardly inclined bottom wall means having its upper end substantially at said plane of said open end of said container, top wall means extending substantially parallel to said bottom wall means, the rearward end of said top wall means being vertically spaced above a portion of said bottom wall means at a location on said bottom wall means at which the space between said top and bottom wall means is substantially equal to the height of one of said articles, said bottom wall means comprising a curved portion at said location below said rearward end of said top wall means, whereby an article passing over said curved portion will support articles thereabove on a portion thereof at the rear of its top surface, said apparatus comprising a number of pairs of top and bottom wall means equal to the number of layers of said articles packed into the height of said container in the vertical direction, each of said bottom wall means after said first bottom wall means having its rearmost end connected to the rearmost end of the preceding top wall means by dividing means, each of said dividing means comprising a short wall means sloping upwardly and rearwardly from its rear end at the upper end of a top wall means of a first pair of top and bottom wall means to its upper end at the upper end of the bottom wall means of the subsequent pair of top and bottom wall means, and the junction of said upper end of said short wall means said upper end of the bottom wall means of said subsequent pair of top and bottom wall means being located substantially at said plane of said open end of said container, whereby said dividing means serves to divide out the bottommost layer of said articles and to direct said bottommost lyaer through the space between the top and bottom wall means rearwardly of said dividing means, and said dividing means serves to lift the remaining layers of articles in said container on said short wall means and to direct them to the subsequent pairs of top and bottom wall means.

4. The apparatus of claim 3 and vibrating means positioned above said open end of said containers in operative cooperation with said moving containers to facilitate the movement of said articles in said containers onto said bottom wall means.

5. The apparatus of claim 3, said top and bottom wall means further comprising portions curving forwardly and downwardly of the rearmost end of said top wall means to comprise a vertically disposed chute, conveyor means disposed below the lowermost end of said chute, whereby said articles are delivered to said conveyor means in the orderly rows in which they were packed in said containers for delivery by said conveyor means in an orderly manner.

6. The apparatus of claim 5, and separator means in said chute adapted to define a number of article passages in said chute equal to the number of articles packed in said container across the width thereof.

7. The apparatus of claim 3, wherein the containers are of the type which comprise front, rear and side flaps adapted to close said open end, and said moving means comprising guide rail means cooperable with said side flaps of said container to support said container and to permit the movement of said container therethrough.

8. The apparatus of claim 7, said moving means further comprising power driven endless belt means running in a substantially horizontal plane in spaced relation beside said rail means, said belt means comprising container pusher arms extending outwardly of said belt means and over said rail means to engage the rear vertical wall of said containers as said containers are moved along said guide rail means.

9. The apparatus of claim 8, said belt means further comprising container front flap supporting means extending outwardly of said endless belt means and in operative cooperation with said guide rail means to support the front flap of said container above the lowermost plane of said guide rail means.

10. The apparatus of claim 3, and container hold down means positioned above the upper ends of said top and bottom wall means a distance substantially equal to the height of said containers in the vertical direction.

11. The apparatus of claim 4, said vibrating means comprising container hold down means positioned above the upper ends of said top and bottom wall means a distance substantially equal to the height of said containers in the vertical direction.

12. The apparatus of claim 3, wherein said articles comprise cylindrical cans open on one end.

References Cited

UNITED STATES PATENTS

| | | | |
|---|---|---|---|
| 2,743,001 | 4/1956 | Nordquist | 198—66 |
| 2,787,359 | 4/1957 | Gerecke | 198—66 X |
| 2,936,917 | 5/1960 | Musgrave | 214—308 X |
| 3,270,903 | 9/1966 | Willms | 214—308 |
| 3,310,187 | 3/1967 | Barker et al. | 214—311 X |

HUGO O. SCHULZ, *Primary Examiner.*

U.S. Cl. X.R.

214—311; 198—66